United States Patent
Stark

(10) Patent No.: US 10,219,528 B2
(45) Date of Patent: *Mar. 5, 2019

(54) FOLIC ACID, METAL COMPLEXES FOR RUMEN BY-PASS NUTRITIONAL SUPPLEMENTATION OF RUMINANTS

(71) Applicant: Zinpro Corporation, Eden Prairie, MN (US)

(72) Inventor: Peter A. Stark, Inver Grove Heights, MN (US)

(73) Assignee: Zinpro Corporation, Eden Prairie, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/716,920

(22) Filed: Sep. 27, 2017

(65) Prior Publication Data

US 2018/0153191 A1 Jun. 7, 2018

Related U.S. Application Data

(63) Continuation-in-part of application No. 15/226,297, filed on Aug. 2, 2016.

(51) Int. Cl.
*A23K 20/174* (2016.01)
*A23K 50/10* (2016.01)
*A23K 20/20* (2016.01)

(52) U.S. Cl.
CPC ............ *A23K 20/174* (2016.05); *A23K 20/30* (2016.05); *A23K 50/10* (2016.05)

(58) Field of Classification Search
CPC ....... A23K 20/174; A23K 20/30; A23K 50/10
See application file for complete search history.

(56) References Cited

U.S. PATENT DOCUMENTS

| | | | | |
|---|---|---|---|---|
| 4,087,556 A | * | 5/1978 | Harte | A23K 40/20 426/2 |
| 4,664,917 A | * | 5/1987 | Meyer | A23K 50/10 426/2 |
| 5,885,610 A | | 3/1999 | Anderson | |
| 2001/0046533 A1 | | 11/2001 | Bailey et al. | |
| 2003/0138524 A1 | * | 7/2003 | Cecava | A23K 20/30 426/74 |
| 2004/0202695 A1 | * | 10/2004 | Moore | A23K 40/30 424/442 |
| 2006/0222685 A1 | * | 10/2006 | Cecava | A23K 20/30 424/442 |
| 2014/0377402 A1 | | 12/2014 | Zorn | |

FOREIGN PATENT DOCUMENTS

| | | | |
|---|---|---|---|
| EP | 2805721 A1 | 11/2014 | |
| GB | 1180252 A | 2/1970 | |
| JP | 2001181211 A * | 7/2001 | ............ A61K 9/143 |

OTHER PUBLICATIONS

Machine translation of JP 2001-181211 (Year: 2001).*
Yang et al. African J of Biotechnol, vol. 10(14), pp. 2574-2578 (Year: 2011).*
Santschi, D.E., et al., "Fate of Supplementary B-Vitamins in the Gastrointestinal Tract of Dairy Cows", Journal Dairy Science (2005), 88: pp. 2043-2054.
Girard, C.L., et al., "Dietary Supplements of Folic Acid During Lactation: Effects on the Performance of Dairy Cows", Journal Dairy Science (1998) 81: pp. 1412-1419.
Zinpro Corporation, PCT/US2017/044580 filed Jul. 31, 2017, "Notification of Transmittal of the International Search Report and the Written Opinion of the International Searching Authority, or the Declaration", dated Oct. 13, 2017.

* cited by examiner

*Primary Examiner* — C. Sayala
(74) *Attorney, Agent, or Firm* — McKee, Voorhees & Sease, PLC

(57) ABSTRACT

A method and composition for dietary supplementation of ruminants with folic acid in a manner that assures the folic acid will not be consumed by rumen bacteria and instead will pass through to the intestine and to the animal's blood serum in order to enhance milk production. The folic acid in water is mixed with a water soluble metal salt of zinc, copper, iron or manganese or mixtures thereof to form a metal folate complex.

12 Claims, 6 Drawing Sheets

FOLIC ACID, METAL COMPLEXES FOR RUMEN BY-PASS NUTRITIONAL SUPPLEMENTATION OF RUMINANTS

CROSS REFERENCE TO A RELATED APPLICATION

This application is a Continuation-in-Part of U.S. Ser. No. 15/226,297, filed Aug. 2, 2016, which is incorporated by reference, in its entirety.

FIELD OF THE INVENTION

This invention relates to a method and composition that assures folic acid will by-pass the rumen so that it will not be consumed by rumen bacteria, and so that it can be allowed to be used by a ruminant animal to support milk production and health.

BACKGROUND OF THE INVENTION

It is well known that for ruminants proper nutrition is essential for efficient and maximized milk production. If minimum requirements of proper nutrients including vitamins such as folic acid are not met, the animal will not produce milk at optimum yield, and its health will generally decline.

It has been reported that as much as 97% of the folic acid introduced into the diet of ruminants is controlled, or rather better put, consumed by the bacteria in the rumen, see *J. Dairy Sci.* 88:2043-2054. In fact, the problem is previously known and the real dilemma is to administer folic acid in a way that it can effectively by-pass the rumen, get into the small intestine and eventually increase the folic acid content in blood serum, which is then indicative of increased milk production, see Dietary Supplements of Folic Acid During Lactation: Effect on the Performance of Dairy Cows, 1998 *J. Dairy Sci.* 81:1412-1419.

In the past this problem has been recognized, and feed developers have used fats, carbohydrates and binders to encapsulate folic acid. This technology involves simple coating of materials in hopes that the coated material is rumen stable. But this has proved more difficult in application than in theory. A primary problem with any product relying upon coatings of any kind for rumen stability is that a coating can become abraded during handling and chewing, resulting in removal of the coating. Moreover, if the coating is too effective it is not effectively absorbed in the intestine either, and then the benefit to the animal is lost.

From the above description it can be seen that there is a real and continuing need for the development of folic acid fortified nutritional supplement that remains stable (will not be consumed by bacteria) in the rumen and yet when in the intestine will be absorbed into the blood serum in order to enhance blood serum levels of folic acid to enhance milk production and animal health. It is a primary objective of this invention to fulfill this need safely, effectively, efficiently and at low cost. The method and means of accomplishing this primary objective as well as others will become apparent from the detailed description of the invention which follows.

SUMMARY OF THE INVENTION

A method and composition for dietary supplementation of ruminants with folic acid in a manner that assures the folic acid will not be consumed by rumen bacteria and instead will pass through to the intestine and to the animal's blood serum in order to enhance milk production and animal health. The folic acid is mixed with a water soluble metal salt of zinc, copper, iron or manganese under conditions that form metal folate complexes which will not be completely consumed in the rumen.

DETAILED DESCRIPTION OF THE PREFERRED EMBODIMENTS

Figure 1:
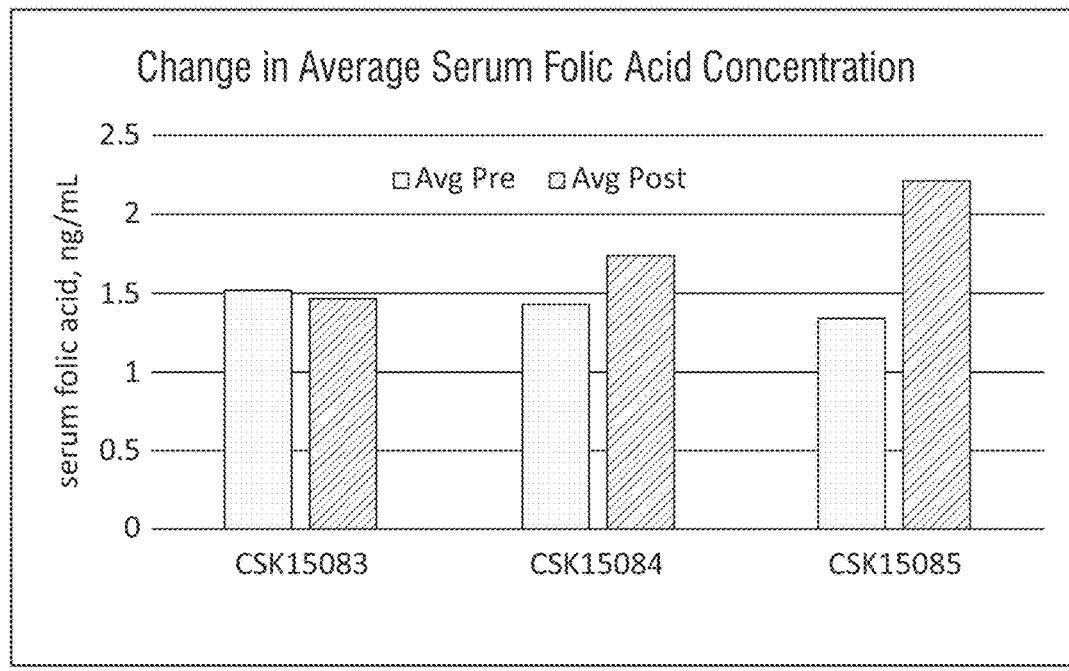
FIG. 1 is the effect of treatment on average serum folic acid concentrations of sheep, pre and post treatment.
Figure 2:
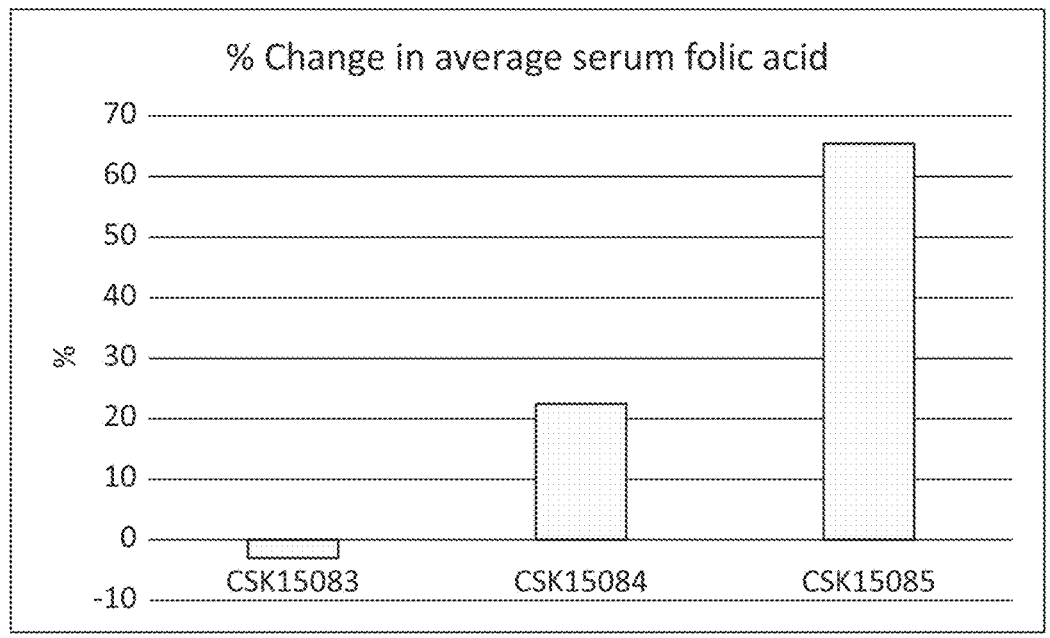
FIG. 2 is the effect of treatment on median serum folic acid concentrations of sheep, comparing no treatment, folic acid alone, and zinc folate.
Figure 3:
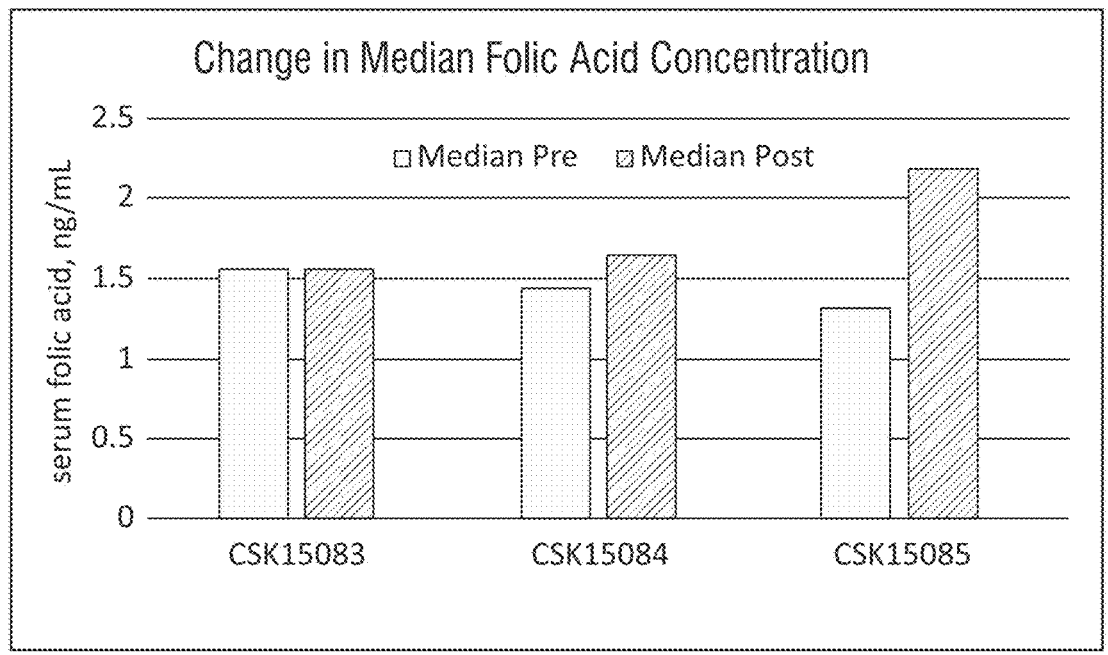
FIG. 3 is a bar graph of the change in median serum folic acid concentrations of sheep, pre and post treatment.
Figure 4:
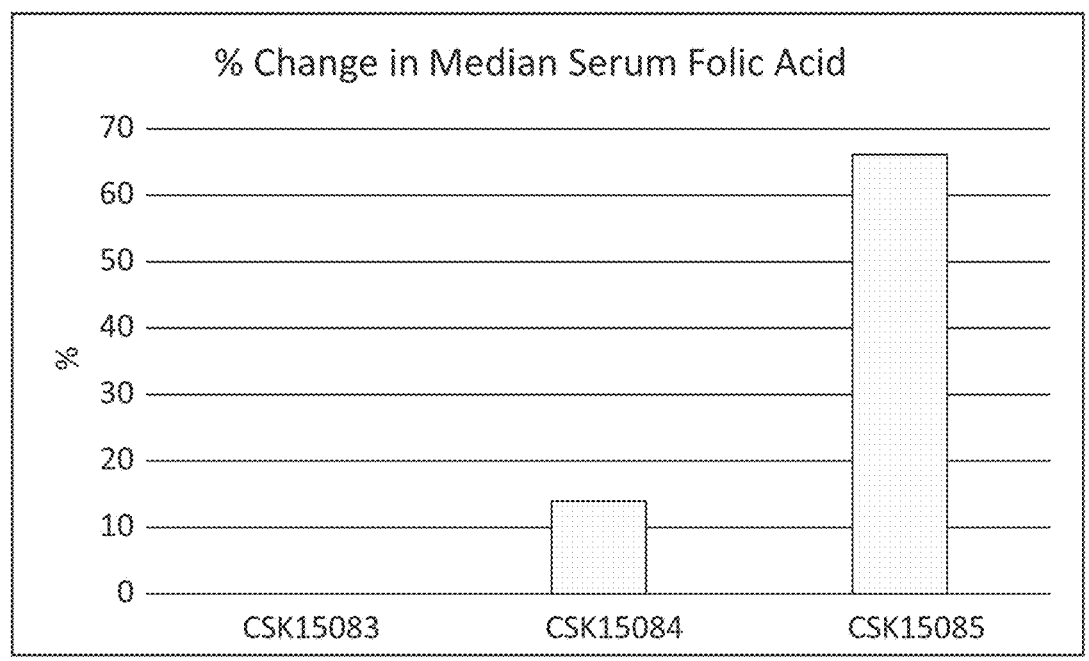
FIG. 4 is a bar graph of % change in median serum folic acid for sheep.

This invention is for ruminant animals. Ruminants ingest feed which first passes into the rumen where it is partially broken down by bacterial fermentation. During fermentation rumen microbes utilize nitrogen from nitrogen compounds that they have degraded to form microbial protein. Nitrogen sources for rumen microbes include protein that is degraded in the rumen, rumen degradable peptides, free amino acids such as crystalline amino acids, and vitamins, including folic acid. Microbial protein and undegraded feed protein pass to the abomasum and small intestine where hydrochloric acid and mammalian enzymes degrade microbial protein and undegraded feed protein to free amino acids and short peptides. The amino acids and short peptides are absorbed in the intestine, and the ruminant animals utilize the amino acids for synthesis of protein to sustain life, grow, reproduce, and produce milk. However, if vitamins like, vitamin B9 folic acid have been "used" or metabolized by rumen microbes, its value to the host animal is lost.

This is especially important for ruminants that are used for milk production since research has determined that folic acid is essential to increased milk production.

As earlier mentioned there are some patents and literature on encapsulated forms of folic acid but as far as the applicant knows, nothing like the chemistry currently presented, which does not rely upon encapsulation.

The structure below is folic acid:

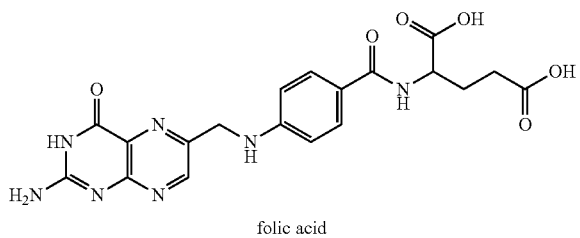 [SMILES: Nc1nc2ncc(CNc3ccc(C(=O)NC(CCC(=O)O)C(=O)O)cc3)nc2c(=O)[nH]1]

folic acid

What this applicant has discovered is that if folic acid is mixed in water with a water soluble metal salt of a metal that is either zinc, copper, iron or manganese, with the salt being a sulfate, chloride, acetate, phosphate or nitrate, something occurs that inhibits the folic acid from being consumed by the microbes in the rumen. Moreover, to the applicant's surprise other soluble metal salts (other than the four metals specifically mentioned) do not work to achieve the same result. For example, calcium and magnesium salts, do not provide the same results, as evidence by some of the comparative examples set forth below. In order for the invention to work the original mixing of the folic acid and the water soluble metal salt must be in water. After the mixing occurs the solution can then be mixed with any suitable non-toxic carrier if one wishes or added to the feed directly.

In making nutritional supplements for the addition of these compositions to the diets of animals, it is preferred that the mixtures of the present invention be added to a carrier or filler material for processabilty, ease of handling and sale. They can, however, also be sold as spray dried powders without any carrier. The use of a carrier or not is a preference of the processing manufacturer and feed supplier. If carriers are used, examples of suitable carriers include distillers' fermentation solubles, feed grains, corn cob flour, whey, and other cellulosic carrier materials, all well known for carrying trace mineral preparations.

The amount of supplement added to the feed ration will, of course, depend on whether one is using the pure spray dried powders, or whether it is being used with a carrier, such as corn cob flour. Basically, the supplement will simply be mixed in with the feed ration as sold.

Generally, the mixture should be supplemented at a level to provide from about 20 mg/head/day to about 160 mg/head/day of folic equivalents, preferably from about 40 mg/head/day to 80 mg/head/day.

The ratio of folic acid to water soluble metal salt on a molar ratio basis should be from about 1:1 to 1:25. While the mixtures must be mixed in solution they can be used as is, dried, dried on a non-toxic carrier afterwards or the carrier can be used as an absorbing carrier to absorb the liquid mixture.

Once the mixture is free flowing it can be combined with other common feed ingredients.

As earlier mentioned while this is suitable for any ruminants the primary ones for domesticated milk production are dairy cattle, goats and sheep.

The following examples 1-26 and data of FIGS. 9-12 are offered to further illustrate but not limit the invention and to demonstrate surprisingly that it appears critical that the water soluble metal salt to be used be a metal salt of zinc, iron, manganese or copper. The anion is not critical as long as it is water soluble, but those earlier referenced are most common.

EXAMPLE 1

Zinc Folate Mixture

Sodium Hydroxide (54.42 g, 1.36 mols) was added to 3000 mL of dI $H_2O$. To this basic solution was added Folic Acid (300.1 g, 0.681 mols) which turned a bright orange. The suspension became a solution over the course of 20 minutes of continuous stirring. Zinc Chloride (91.81 g, 0.680 mols) was added to the bright orange solution. This mixture was dried at 60° C. in the vacuum oven to produce a red-orange non-hydroscopic solid (415 g, 98.3% Theory).

EXAMPLE 2

Zinc Folate on Silica Mixture

Sodium Hydroxide (3.63 g, 0.091 mols) was added to 100.1 mL of dI $H_2O$. To this basic solution was added Folic Acid (20.0 g, 0.045 mols) which turned a bright orange. The suspension became a solution over the course of 20 minutes of continuous stirring. Zinc Chloride (6.08 g, 0.045 mols) was added to the bright orange solution. Silica gel (134.19 g) is then added to the aqueous mixture until the mixture becomes a free flowing solid. Total weight: 220.5 g of free flowing solid.

EXAMPLE 3

Copper Folate Mixture

Sodium Hydroxide (3.65 g, 0.090 mols) was added to 200 mL of dI $H_2O$. To this basic solution was added Folic Acid (20.00 g, 0.045 mols) which turned a bright orange. The suspension became a solution with 20 minutes of continuous stirring. Copper Chloride dihydrate (7.75 g, 0.045 mols) was added to the bright orange solution. This mixture was dried at 60° C. in the vacuum oven until dry to product a green-yellow non-hydroscopic solid (25.5 g, 91.4% Theory).

EXAMPLE 4

Copper Folate Mixture on Silica

Sodium Hydroxide (3.60 g, 0.090 mols) was added to 300 mL of dI $H_2O$. To this basic solution was added Folic Acid (20.10 g, 0.045 mols) which turned a bright orange. The suspension became a solution with 20 minutes of continuous stirring. Copper Chloride dihydrate (7.74 g, 0.045 mols) was added to the bright orange solution. Silica gel (271.56 g) is then added to the aqueous mixture until the mixture becomes a free flowing solid. Total weight: 603 g of free flowing solid.

EXAMPLE 5

Manganese Folate Mixture

Sodium Hydroxide (7.32 g, 0.182 mols) was added to 400 mL of dI $H_2O$. To this basic solution was added Folic Acid (39.93 g, 0.091 mols) which turned a bright orange.

The suspension became a solution with 20 minutes of stirring with a magnetic stir bar. To the solution anhydrous Manganese Chloride (11.48 g, 0.091 mols) was added in one portion which was dried at 60° C. in the vacuum oven until dry to produce a dark orange/red non-hydroscopic solid (52.3 g, 94.1% Theory).

EXAMPLE 6

Manganese Folate Mixture on Silica

Sodium Hydroxide (3.65 g, 0.090 mols) was added to 200 mL of dI $H_2O$. To this basic solution was added Folic Acid (20.01 g, 0.045 mols) which turned a bright orange. The suspension became a solution with 20 minutes of continuous stirring. Manganese Chloride (5.74 g, 0.045 mols) was added in one portion. Silica gel (307.6 g) is then added to the aqueous mixture until the solution becomes a free flowing solid. Total weight: 537 g of free flowing solid.

EXAMPLE 7

Iron Folate Mixture

Sodium Hydoxide (3.66 g, 0.090 mols) was added to 200 mL of dI $H_2O$. Folic acid (19.95 g, 0.045 mols) was added to this basic solution which turned a bright orange. The suspension became a solution with 20 minutes of continuous stirring with a magnetic stir bar. Ferrous Chloride tetrahydrate (9.05 g, 0.045 mols) was added to the bright orange solution which was dried at 60° C. in the vacuum oven until dry to produce a green-brown non-hydroscopic solid (26.1 g, 95.9% Theory).

EXAMPLE 8

Iron Folate Mixture on Silica

Sodium Hydroxide (3.63 g, 0.090 mols) was added to 200 mL of dI $H_2O$. To this basic solution was added Folic Acid (20.05 g, 0.045 mols) which turned a bright orange.

The suspension became a solution with 20 minutes of continuous stirring. Ferrous Chloride tetrahydrate (9.00 g, 0.045 mols) was added to the bright orange solution. Silica gel (225.3 g) is then added to the aqueous mixture until the mixture becomes a free flowing solid. Total weight: 458 g of free flowing solid.

EXAMPLE 9

Magnesium Folate Mixture

Sodium Hydroxide (5.44 g, 0.132 mols) was added to 200 mL of dI $H_2O$. To this basic solution was added Folic Acid (30.01 g, 0.068 mols) which turned a bright orange. The suspension became a solution with 20 minutes of stirring with a magnetic stir bar. To this solution was added Magnesium Chloride Hexahydrate (13.80 g, 0.068 mols) which was dried at 60° C. in the vacuum oven until dry to produce a light orange non-hydroscopic solid (37.3 g, 94.6% Theory).

EXAMPLE 10

Magnesium Folate Mixture on Silica

Sodium Hydroxide (3.60 g, 0.090 mols) was added to 200 mL of dI $H_2O$. To this basic solution was added Folic Acid (19.97 g, 0.045 mols) which turned a bright orange. The suspension became a solution with 20 minutes of continuous stirring. To this solution was added Magnesium Chloride Hexahydrate (9.25 g, 0.045 mols). Silica gel (229.2 g) is then added to the aqueous mixture until the mixture becomes a free flowing solid. Total weight: 462 g of free flowing solid.

EXAMPLE 11

Calcium Folate Mixture

Sodium Hydroxide (6.00 g, 0.150 mols) was added to 200 mL of dI $H_2O$. Folic acid (33.05 g, 0.075 mols) was added to the basic solution which turned into a bright orange suspension. The suspension gradually formed a solution after 20 minutes of stirring with a magnetic stir bar. To this solution was added Calcium chloride dihydrate (11.01 g, 0.075 mols) which was dried at 60° C. in the vacuum oven until dry to produce a light orange non-hydroscopic solid (42.6 g, 95.3% Theory).

EXAMPLE 12

Calcium Folate Mixture on Silica

Sodium Hydroxide (3.61 g, 0.090 mols) was added to 200 mL of dI $H_2O$. To this basic solution was added Folic Acid (20.07 g, 0.045 mols) which turned a bright orange. The suspension became a solution with 20 minutes of continuous stirring. To this solution was added Calcium Chloride Dihydrate (6.69 g, 0.045 mols). Silica gel (281.6 g) is then added to the aqueous mixture until the mixture becomes a free flowing solid. Total weight: 512 g of free flowing solid.

EXAMPLE 13

Zinc Folate Mixture on Ground Corn Cob

Sodium Hydroxide (1.81 g, 0.045 mols) was added to 100 mL of dI $H_2O$. To this solution was added Folic Acid (9.99 g, 0.023 mols) which turned a bright orange. The suspension became a solution over the course of 20 minutes of continuous stirring. Zinc Chloride (3.09 g, 0.023 mols) was added to the bright orange solution and to the mixture was added ground corn cob (4.36 g) and stirred until homogenous. This mixture is then dried at 60° C. in a vacuum oven. Total Weight: 19.34 g of a fine solid.

EXAMPLE 14

Zinc Folate Mixture on Ground Corn Cob

Sodium Hydroxide (0.91 g, 0.023 mols) was added to 70 mL of dI $H_2O$. To this solution was added Folic Acid (5.03 g, 0.011 mols) which turned a bright orange. The suspension became a solution over the course of 20 minutes of continuous stirring. Zinc Chloride (30.87 g, 0.23 mols) was added to the bright orange solution and to the mixture was added to ground corn cob (11.7 g) and stirred until homogenous. This mixture is then dried at 60° C. in a vacuum oven. Total Weight: 45.6 of a fine solid.

EXAMPLE 15

Zinc Folate Mixture on Silica

Sodium Hydroxide (1.27 g, 0.032 mols) was added to 100 mL of dI $H_2O$. To this basic solution was added Folic Acid (7.00g, 0.016 mols) which turned a bright orange. The suspension became a solution over the course of 20 minutes of continuous stirring. Zinc chloride (43.2 g, 0.318 mols) was added to the bright orange solution and to the mixture was added silica gel (99.98 g) until the mixture became a free flowing solid. Total Weight: 251.71 g of a free flowing solid.

EXAMPLE 16

Copper Folate Mixture on Cellulose

Sodium hydroxide (2.72 g, 0.068 mols) was added to 150 mL of dI $H_2O$. To this basic solution was added Folic Acid (14.98 g, 0.034 mols) which turned a bright orange. The suspension became a solution over the course of 20 minutes of continuous stirring. Copper Chloride dihydrate (57.99 g, 0.34 mols) was added to the bright orange solution which was added to cellulose (20.6 g) and stirred until homogenous. This mixture was then dried at 60° C. in a vacuum oven. Total Weight: 87.33 g of a fine solid.

EXAMPLE 17

Manganese Folate Mixture on Ground Corn

Sodium Hydroxide (2.18 g, 0.054 mols) was added to 100 mL of dI H$_2$O. To this basic solution was added Folic Acid (12.01 g, 0.027 mols) which turned a bright orange. The suspension became a solution over the course of 20 minutes of continuous stirring. Manganese Chloride tetrahydrate (5.39 g, 0.027 mols) was added to the bright orange solution which was added to ground corn (5.8 g) and stirred until homogenous. This mixture was then dried at 60° C. in a vacuum oven. Total Weight: 19.76 g of a fine solid.

EXAMPLE 18

Manganese Folate Mixture on Ground Corn Cob

Sodium Hydroxide (1.45 g, 0.036 mols) was added to 120 mL of dI H$_2$O. To this basic solution was added Folic Acid (8.00 g, 0.018 mols) which turned a bright orange. The suspension became a solution over the course of 20 minutes of continuous stirring. Manganese chloride tetrahydrate (17.95 g, 0.091 mols) was added to the bright orange solution which was added to ground corn cob (8.65 g) and stirred until homogenous. The carrier mixture was then dried at 60° C. in a vacuum oven. Total Weight: 32.80 g of a fine solid.

EXAMPLE 19

Iron Folate Mixture on Ground Corn Cob

Sodium Hydroxide (2.00 g, 0.05 mols) was added to 250 mL of dI H$_2$O. To this basic solution was added Folic Acid (11.05 g, 0.025 mols) which turned a bright orange. The suspension became a solution over the course of 20 minutes of continuous stirring. Iron (II) chloride tetrahydrate (49.59 g, 0.294 mols) was added to the bright orange solution which was added to ground corn cob (20.2 g) and stirred until homogenous. The carrier mixture was then dried at 60° C. in a vacuum oven. Total Weight: 58.70 g of a fine solid.

EXAMPLE 20

Sheep Serum Concentrations

Sheep were tested with three different samples, sample CSK15083 with no folic acid present, CSK15084 which is folic acid itself and CSK15085, which represents an example of the invention zinc folate mixture as prepared in Example 1, (see FIGS. 1-4).

The animals were separated into groups and housed in a barn with access to a pasture. The dosing regime was as follows. The daily folic acid dose was mixed with ground corn to create a test article fed at the rate of 0.5 pounds per sheep per day. The sheep were fed the test feeds for fourteen (14) days. The folic acid equivalent fed to each head per day was thirty (30) milligrams.

The results of the study are shown in FIGS. 1-4. They all indicate that whether one looks at the mean or the median, serum folic acid concentrations increased the greatest when the sheep were dosed with CSK15085, the product of the invention (FIGS. 1-4). Serum folic acid concentration of sheep feed either CSK15084 or CSK15085 increased while serum folic acid concentrations of sheep feed CSK15083 did not change after being fed the test articles. Serum blood level enhancement of folic acid is an indication that milk production will be substantially increased, as indicated in the earlier referenced articles. Moreover, the zinc folate mixture performed better than folic acid alone.

Sheep fed the calcium and magnesium salts of Examples 9-12 showed no increase in blood serum levels of folic acid when compared to controls of folic acid alone.

EXAMPLE 21

Calf Study

Example 21 is a cattle study. In the drawing FIG. 5, CSK 16083 represents folic acid alone; CSK16084 is a copper-folic acid mixture 1:1 (Example 3) and CSK 16085 is a copper-folic acid mixture 1:10 on cellulose (Example 16).

Figure 5:
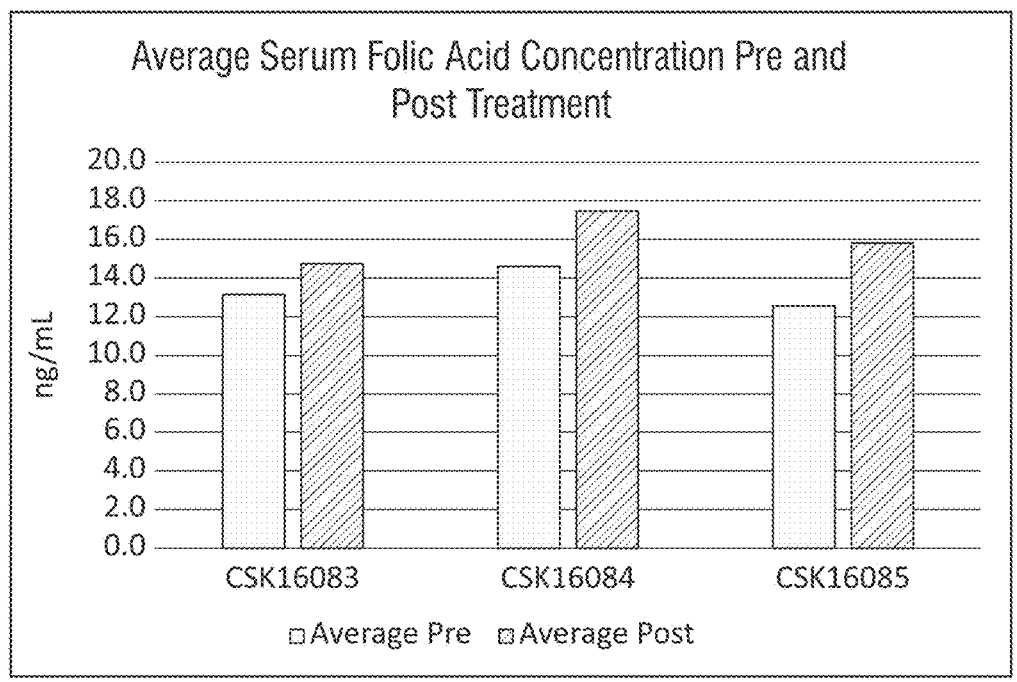
FIG. 5 is an average change in folic acid for cattle using the formulations of examples three and sixteen.

The cattle calves were fed 120 mg of the folic acid source per day for 14 days along with feed at the rate of 2 lbs/head. Comparison with no folic acid control group is shown in FIG. 5. It can be seen that blood serum folic acid changed significantly for the positive with the formulation of Example 3 and Example 16.

EXAMPLE 22

Sheep

Figure 6:
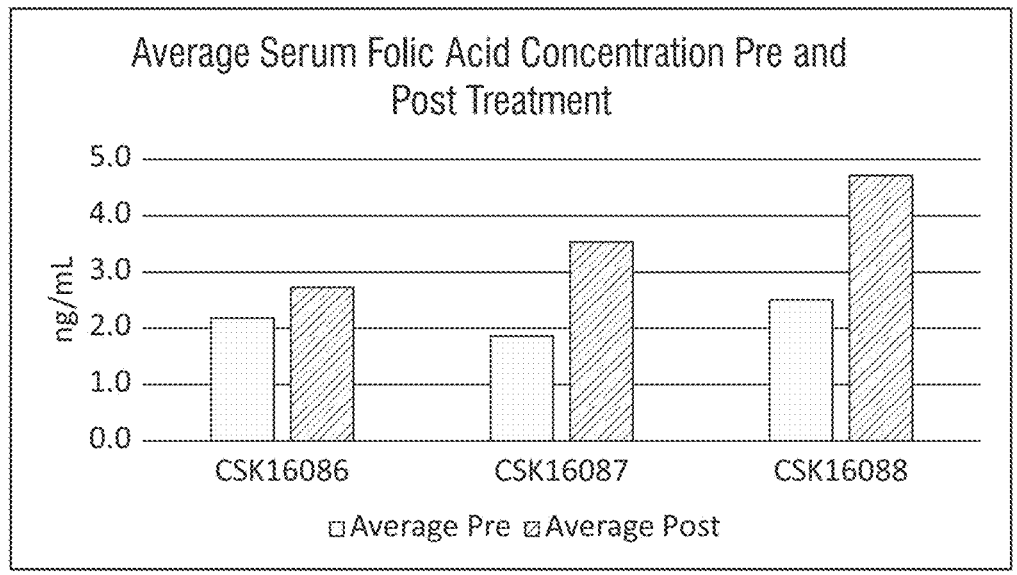
FIG. 6 is an average change graph for sheep with the product of examples five and seven.
Figure 7:
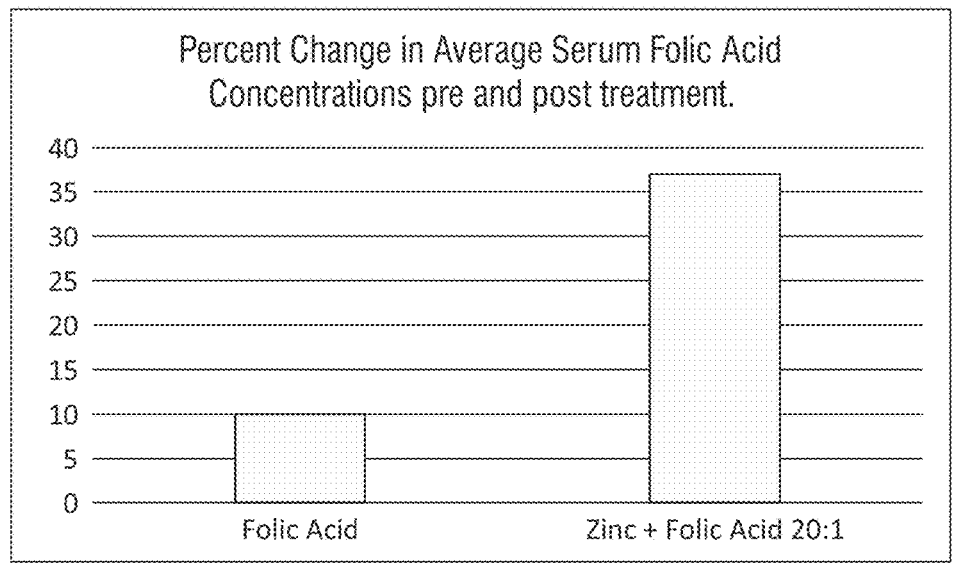
FIG. 7 shows zinc folic acid mixture with silica gel until free flowing then blended with ground corn cob.

Example 22 is a sheep study using the protocol of Example 20 but with the Mn and iron mixtures of Example 5 and 7, respectively. In FIG. 6, CSK16086 is folic acid alone; CSK16087 is the 1:1 mixture of iron and folic acid (Example 7) and CSK16088 is the mixture of manganese and folic acid, [Example 5]. As can be seen in FIG. 7 the blood serum folic acid concentration for the mixtures of example 5 and 7 change significantly for the positive. In this test the ewes were fed the concentrate metal folate mixture dried without any carrier but mixed on ground corn for feeding.

EXAMPLE 23

In this example the zinc folic acid mixture was mixed with silica gel until free flowing and then blended with ground corn cob for the trial.

Zinc Folic Acid mixture 20:1 dried on the silica, as prepared in Example 15. The data is shown in FIG. 7.

EXAMPLE 24

Zinc Folate Mixture

Sodium Hydroxide (0.96 g, 0.024 mols) was added to 1100 mL of dI H$_2$O. To this basic solution was added Folic Acid (5.40 g, 0.012 mols) which turned a bright orange. The suspension became a solution over the course of 20 minutes of continuous stirring. Zinc Chloride (16.68 g, 0.12 mols) was added to the bright orange solution which was easily stirred. The fine suspension was easily sprayed onto dry animal feed (ground corn).

EXAMPLE 25

Manganese Folate Mixture

Sodium Hydroxide (0.98 g, 0.024 mols) was added to 1120 mL of dI H$_2$O. To this basic solution was added Folic Acid (5.30 g, 0.012 mols) which turned a bright orange. The suspension became a solution over the course of 20 minutes of continuous stirring. Manganese chloride tetrahydrate (23.11 g, 0.18 mols) was added to the bright orange solution which was easily stirred. The fine suspension was easily sprayed onto dry animal feed (ground corn).

EXAMPLE 26

Figure 8:
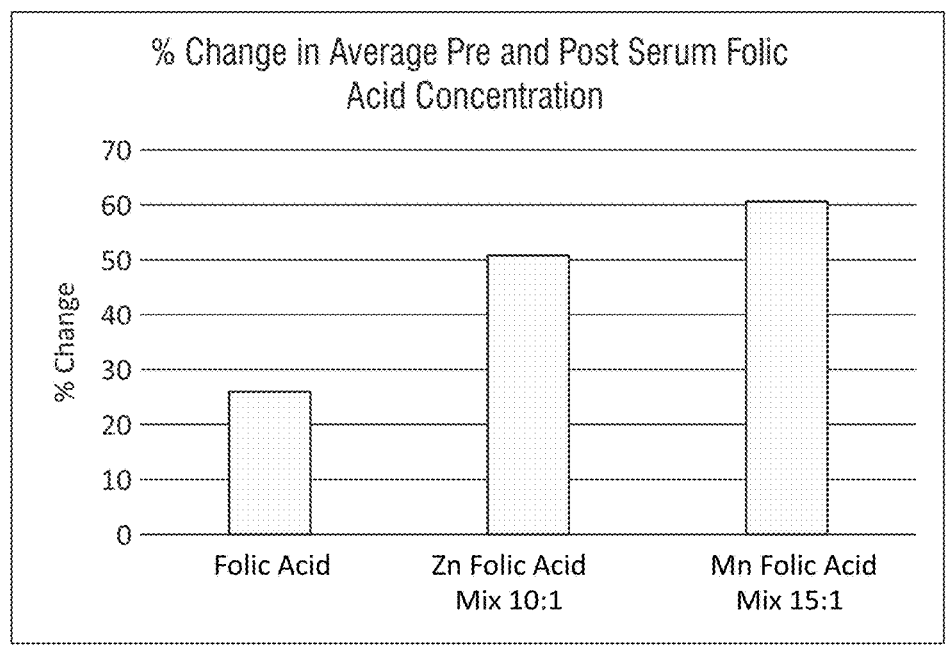
FIG. 8 shows liquid mixture of both zinc and manganese folic acid sprayed directly on ground corn.
Figure 9:
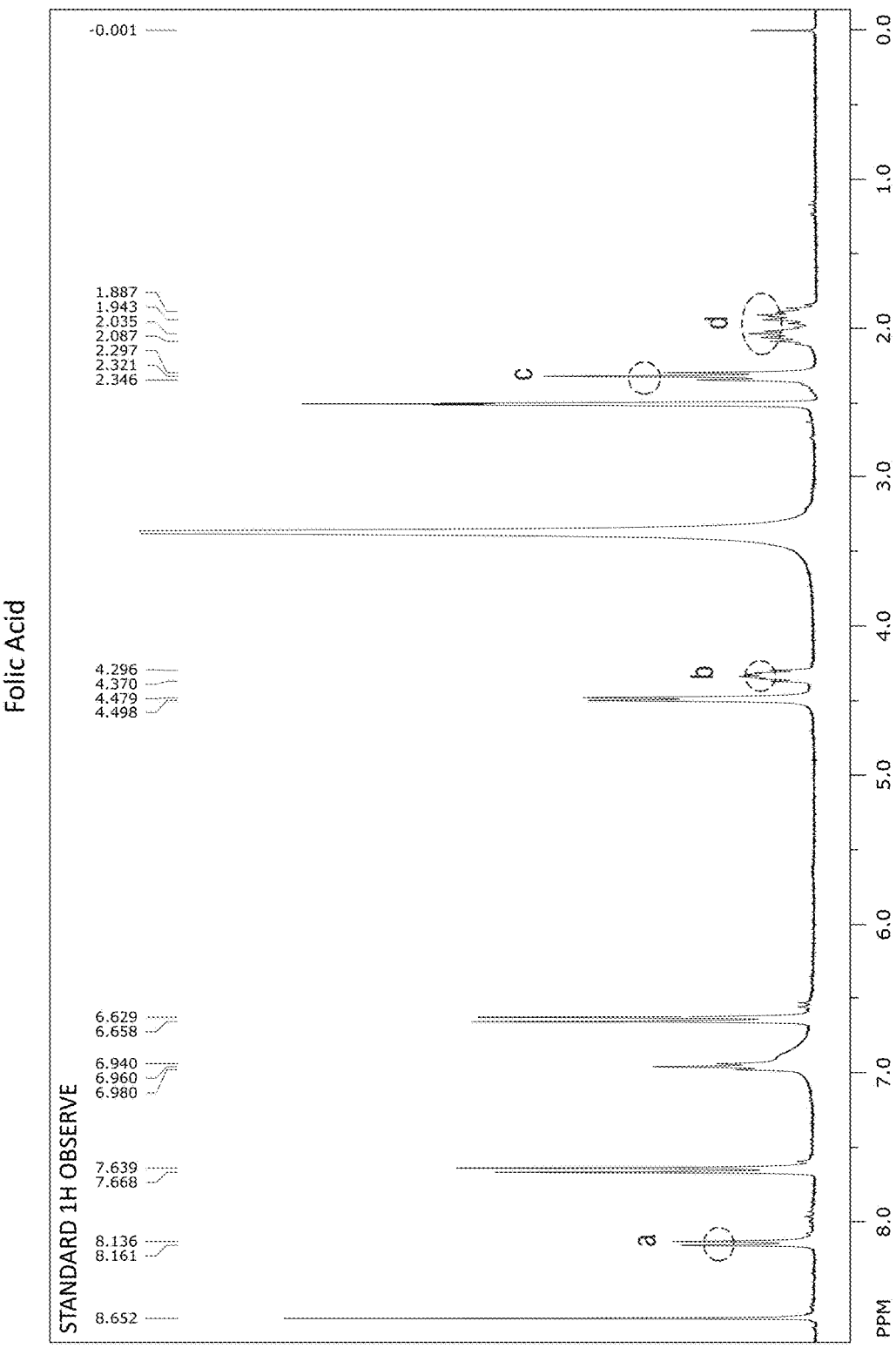
FIG. 9 is a nuclear magnetic resonance (NMR) spectra of folic acid.
Figure 10:
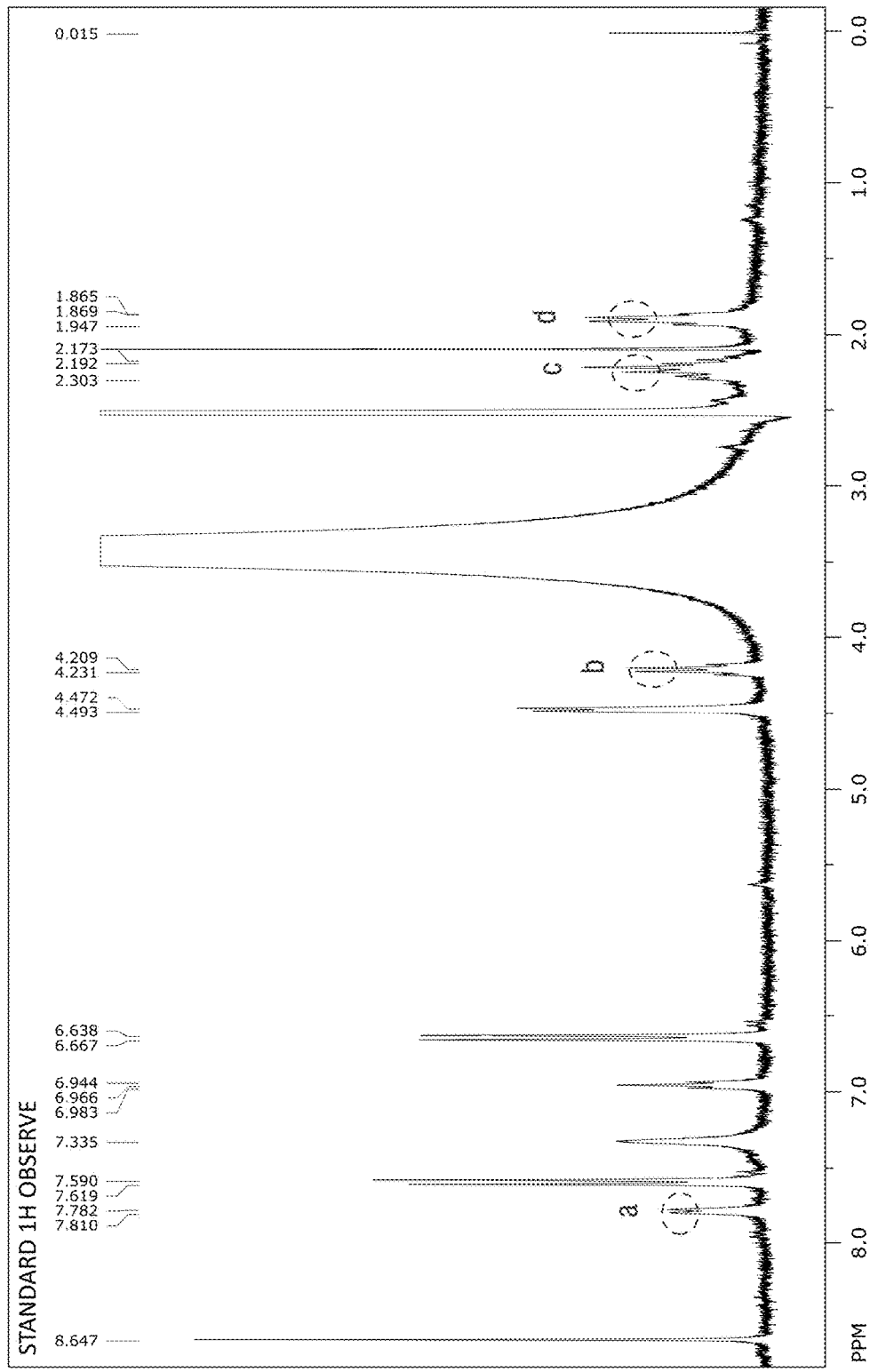
FIG. 10 is an NMR of zinc folate complex.

Zn Folic Acid mixture 10:1 was prepared as described in Example 24, and Mn Folic Acid mixture (15:1) as described in Example 25. The liquid mixtures were then sprayed directly on ground corn. The serum results (sheep) are shown in FIG. 8, and demonstrate effectiveness can be achieved without a carrier, if one wishes.

The Complexation Evidence

An accepted Chemical Dictionary definition of a complex is as follows:

A complex is a molecular entity formed by loose association involving two or more component molecular entities (ionic or uncharged), or the corresponding chemical species. The bonding between the components is normally weaker than in a covalent bond. In inorganic chemistry the term "coordination entity" is recommended instead of "complex" (IUPAC inorganic NOMENCLATURE (1990).

The two chemical entities are not chemically changed. There is just an association between the two molecules. This is a chemical equilibrium that favors the association. As explained below, the differences between the pure folic acid and the zinc folate NMR spectra demonstrates complexation of the zinc to the folic acid molecule. The most significant shifts in the zinc folate spectrum are from those atoms which are most directly associated with the bonding. These atoms are labeled as a, b, c and d and the associated peaks are highlighted in the spectra below with circles (see FIGS. 9 and 10).

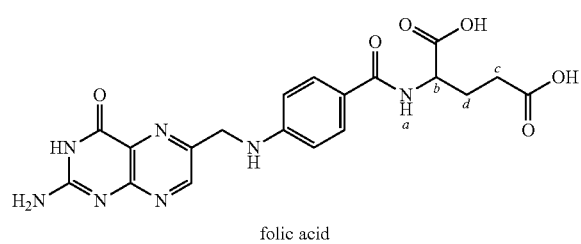 [SMILES: Nc1nc2ncc(CNc3ccc(C(=O)NC(CCC(=O)O)C(=O)O)cc3)nc2c(=O)[nH]1]

folic acid

The NMR indicated complex of zinc folate (FIG. 10) is as follows:

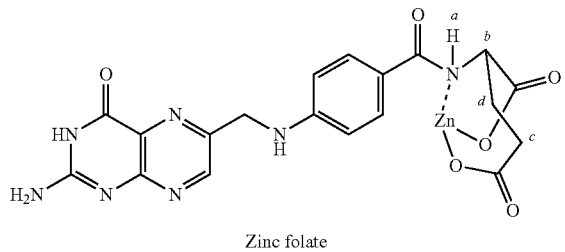

Zinc folate

A shift in the NMR spectra especially at the atoms critical to the complexation is due to the sharing of electrons between the metallic zinc and folic acid.

The protons labelled a, b, c and d which all participate in the proposed complex showed a shift illustrated in the table below. The protons in the other regions of the molecule show no significant change.

TABLE I

|  | Amino NH (a) | Peak 2 | Peak 3 | Peak 4 | Peak 5 | Alpha (b) | Gamma (c) | Beta (d) | Beta (d) |
|---|---|---|---|---|---|---|---|---|---|
| Folic Acid | 8.113 | 7.616 | 6.918 | 6.605 | 4.455 | 4.308 | 2.27 | 2.273 | 1.903 |
|  | 8.138 | 7.645 | 6.937 | 6.635 | 4.475 | 4.313 | 2.32 | 2.322 | 2.011 |
|  |  | 6.956 |  |  |  |  |  |  |  |
|  |  |  |  |  |  |  | 2H | 1H | 1H |
| Zinc Folate | 7.7425 | 7.55 | 6.9042 | 6.5892 | 4.4208 | 4.162 | 2.17 | Merged | 1.8381 |
|  | 7.7745 | 7.579 | 6.9258 | 6.6268 | 4.4535 | 4.191 | 2.26 | Merged | 1.9045 |
|  |  |  | 6.945 |  |  |  |  |  |  |
|  |  |  |  |  |  |  | 2H |  | 2H |

Based on the NMR differences it is reasonable to conclude that the conditions used to prepare the mixture of zinc and folic acid were actually making the complex depicted in the zinc folate structure. The inventor was unable to grow crystals of this complex to definitely prove the complex structure using xray diffraction. However, from the NMR of the affected protons is consistent with the proposed structure.

Solubility Tests

In the parent application is was noticed that when soluble metal salts were mixed with folic acid there would be a precipitate forming after the addition of the metal salt. This precipitate was isolated and its solubility measured. According to the following procedure:

The precipitates were suspended in water and the pH was adjusted to 7.0 with dilute HCl. What was believed to be the folate complexes were stirred at this pH for 15 minutes and then filtered through a Buchner funnel. The solids were dried and weighed to determine the mass of insoluble product. Very similar molar amounts of folic acid are used in this procedure.

| Solubility Summary Table II | | | | | |
|---|---|---|---|---|---|
|  | Weight of Compound | Folate Equivalents | pH of Suspension | Insoluble Mass | Insoluble % |
| Zinc Folate | 3.75 g | 3.00 g | 7.003 | 3.70 g | 99% |
| Copper Folate | 4.17 g | 3.00 g | 6.994 | 4.09 g | 98% |

-continued

Solubility Summary Table II

| | Weight of Compound | Folate Equivalents | pH of Suspension | Insoluble Mass | Insoluble % |
|---|---|---|---|---|---|
| Manganese Folate | 3.73 g | 2.98 g | 7.005 | 3.64 g | 98% |
| Iron Folate | 3.89 g | 2.99 g | 6.990 | 3.74 g | 96% |
| Folic Acid (control) | 3.01 | 3.01 | 7.008 | 0.01 g | 0.33% |

This summary table data demonstrates that the complexation or association between the metal and folic acid produces a change in the solubility properties of this material. Free inorganic zinc is highly soluble at a pH of 7. Free folic acid is also soluble at a pH of 7 as shown in the table. The complex is insoluble at this pH. Elemental analysis shown below confirms the presence of the metal and folic acid portions in the insoluble material.

EXAMPLE 27

Zinc Folate

Zinc folate (3.75 g, 6.8 mmols) was suspended in 100 mL of $H_2O$. The pH was adjusted to 7.0 with the addition of dilute hydrochloric acid. The neutral pH suspension was stirred for 20 minutes. After the stirring period was complete the suspension was filtered utilizing a büchner funnel. The solid was collected, dried, weighed and was determined to be 3.70 g of zinc folate or 99% insoluble at pH 7.0.

EXAMPLE 28

Copper Folate

Copper folate (4.17 g, 6.8 mmols) was suspended in 100 mL of $H_2O$. The pH was adjusted to 7.0 with the addition of dilute hydrochloric acid. The neutral pH suspension was stirred for 20 minutes. After the stirring period was complete the suspension was filtered utilizing a büchner funnel. The solid was collected, dried, weighed and was determined to be 4.09 g of copper folate or 98% insoluble at pH 7.0.

EXAMPLE 29

Manganese Folate

Manganese folate (3.73 g, 6.8 mmols) was suspended in 100 mL of $H_2O$. The pH was adjusted to 7.0 with the addition of dilute hydrochloric acid. The neutral pH suspension was stirred for 20 minutes. After the stirring period was complete the suspension was filtered utilizing a büchner funnel. The solid was collected, dried, weighed and was determined to be 3.64 g of manganese folate or 98% insoluble at pH 7.0.

EXAMPLE 30

Iron Folate

Iron folate (3.89 g, 6.8 mmols) was suspended in 100 mL of $H_2O$. The pH of the suspension was adjusted to 7.0 with the addition of dilute hydrochloric acid. The neutral pH suspension was stirred for 20 minutes. After the stirring period was complete the suspension was filtered utilizing a büchner funnel. The solid was collected, dried, weighed and was determined to be 3.74 g of iron folate or 96% insoluble at pH 7.0.

EXAMPLE 31

Folic Acid

Folic Acid (3.01 g, 6.8 mmols) was suspended in 100 mL of $H_2O$. The pH of the suspension was adjusted to 7.0 with the addition of dilute sodium hydroxide. The neutral pH mixture was stirred for 20 minutes. After the stirring period was complete the clear red solution was filtered utilizing a büchner funnel. The solid was collected, dried, weighed and was determined to be 0.01 g of folic acid or 0.33% insoluble at pH 7.0.

TABLE III

FILTERED METAL FOLATE COMPLEXES

| | Metal | N | C | H | Structure |
|---|---|---|---|---|---|
| Zinc Folate (1:1) | 11.6 | 17.78 | 41.12 | 3.76 | ZnFolate-3H2O |
| Manganese Folate (1:1) | 9.4 | 17.86 | 40.89 | 3.72 | MnFolate-3H2O |
| Copper Folate (1:1) | 15.52 | 15.6 | 34.99 | 3.94 | CuFolate-3H2O-0.5Cu |
| Iron Folate (1:1) | 10.8 | 18.17 | 41.77 | 3.55 | FeFolate-2H2O |

The analysis of the metal associated with the folic acid are shown in the above table. They are all 1 metal to 1 folic acid except with copper that binds more copper to the associated mixture or complex. We do know there is bonding/association taking place that is chemically changing the physical properties of the folic acid. This was demonstrated with the NMR for zinc with a proposed structure, see Table I. It was also demonstrated by the solubility data (Table II) and for the elemental analysis of all the metal complexes (Table III).

What is claimed is:

1. A method of dietary supplementation of ruminants with metal folate complexes that will by-pass the rumen bacteria, comprising:
    feeding to a ruminant animal a water soluble metal salt, with the metal being selected from the group consisting of zinc, copper, iron and manganese, in combination with folic acid.

2. The method of claim 1 where in the ruminant is selected from the group consisting of cattle, goats and sheep.

3. The method of claim 1 wherein the water soluble metal salt has an anion sourced from the group consisting of sulfates, chloride, acetate, phosphates and nitrates.

4. The method of claim 1 wherein the molar ratio of folic acid to water soluble metal salt is from about 1:1 to about 1:25 in the process of forming the metal folate complex.

5. The method of claim 1 wherein the metal folate is placed on a non-toxic carrier.

6. The method of claim 5 wherein the carrier is selected from the group consisting of distillers fermentation solubles, feed grains, corn cob flour, and whey.

7. The method of claim 1 wherein the feeding of the mixture occurs at a rate of from 20 mg/head/day to 160 mg/head/day of folic acid equivalents.

8. The method of claim 7 wherein the feeding occurs at a rate of from 40 mg/head/day to 80 mg/head/day.

9. The method of claim 5 where the mixture on a carrier is mixed with feed ingredients.

10. A composition which is rumen stable, but intestine soluble to provide increased ruminant animal blood serum folic acid levels, comprising:
    a metal folate complex formed of a water soluble metal salt of a metal cation selected from the group consisting of iron, copper, zinc and manganese, and folic acid.

11. The composition of claim 10 mixed with a carrier selected from the group consisting of distillers fermentation solubles, feed grains, corn cob flour, and whey.

12. The composition of claim 10 wherein the water soluble metal salt has an anion selected from the group consisting of sulfates, nitrates, phosphates, chloride, and acetate.

\* \* \* \* \*